United States Patent
Hwang et al.

(10) Patent No.: US 6,382,024 B1
(45) Date of Patent: May 7, 2002

(54) THERMOCOUPLE BOUNDARY LAYER RAKE

(75) Inventors: Danny P. Hwang, Strongsville; Herbert A. Will, Hudson; Gustave C. Fralick, Middleburgh Hts., all of OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 16 days.

(21) Appl. No.: 09/613,052

(22) Filed: Jun. 28, 2000

(51) Int. Cl.[7] ................................................. G01F 1/68
(52) U.S. Cl. ................................................. 73/204.24
(58) Field of Search .................... 73/204.24, 204.23, 73/204.26, 204.11, 204.19, 170.02, 170.27; 374/166, 148, 54; 136/225, 226, 230

(56) References Cited

U.S. PATENT DOCUMENTS

| | | | |
|---|---|---|---|
| 4,587,843 A | 5/1986 | Tokura | |
| 4,727,751 A | 3/1988 | Holmes | |
| 5,209,111 A | 5/1993 | Agarwal | |
| 5,218,863 A | 6/1993 | Mangalam | |
| 5,237,866 A | 8/1993 | Nijdam | |
| 5,272,915 A | 12/1993 | Gelbach | |
| 5,288,147 A | * 2/1994 | Schaefer et al. | 374/10 |
| 5,557,967 A | * 9/1996 | Renger | 73/204.24 |
| 5,576,488 A | 11/1996 | Sheplak | |
| 5,629,482 A | 5/1997 | Vaitkus | |
| 5,789,020 A | 8/1998 | Tran | |
| 5,908,985 A | * 6/1999 | Maatuk | 73/295 |
| 5,942,683 A | * 8/1999 | Aoi et al. | 73/202.5 |

* cited by examiner

*Primary Examiner*—Benjamin R. Fuller
*Assistant Examiner*—Jewel V. Thompson
(74) *Attorney, Agent, or Firm*—Kent N. Stone

(57) ABSTRACT

Apparatus and method for providing a velocity flow profile near a reference surface. A measuring device utilizes a plurality of thermojunction pairs to provide the velocity flow profile in accordance with behavior of a gas relative to a constant thickness strut which stands vertically from the reference surface such that the span is normal to the surface, and the chord is parallel to the surface along the initial flow direction. Each thermojunction is carried on either side of a heater formed on a measuring surface in a constant thickness portion of a strut. Additionally, each thermojunction of a given pair is located at a predetermined height from the reference surface. Gas velocity data obtained from temperature differentials from one side of the heater to the other at each successive height is utilized to generate the velocity and turbulence level profiles.

16 Claims, 5 Drawing Sheets

Constant velocity region on a constant thickness airfoil at Mach number = 0.8

THERMOCOUPLE BOUNDARY LAYER RAKE

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

1. Field of Invention

This invention pertains to the art of methods and apparatuses used to determine a velocity flow profile at a boundary layer and more particularly to the use of a thermocouple rake to relate temperature differentials to a velocity flow profile.

2. Description of the Related Art

The flow profile near a surface is essential information needed to calculate viscous shear force, and to develop a turbulence model for computation fluid dynamic (CFD) application.

There are two general methods used in the art to measure the boundary layer velocity profile. One is a total pressure rake consisting of an array of total pressure probes on the order of 0.02 inches in diameter. The total pressure rake can produce very steady and reliable data, but the physical requirements of the device prevents measurements extremely close to the surface.

Another method uses what is termed "hot-film" or "hot-wire" as set forth in U.S. Pat. No. 4,727,751. These type of devices have the disadvantages of higher uncertainty in the measurements and greater susceptibility to breakage. Also, thermal transfer concerns create an inability to obtain measurements close to the surface. Such thermal transfer concerns are not encountered in the use of the present invention.

U.S. Pat. No. 4,587,843 is directed to a thermocouple-type gas-flow measuring apparatus including a plurality of thermocouples formed in series on a substrate. The series of thermocouples is used to enhance the signal amplitude to provide the stream velocity of a fluid, rather than a velocity profile provided by the present invention.

None of the above mentioned devices or methods provide a velocity flow profile as close to a surface as can be produced by the present invention.

SUMMARY OF THE INVENTION

The present invention is directed to a fluid-flow measuring device which utilizes one or more pairs of thermocouples to provide a velocity flow profile.

In accordance with the present invention, there is provided an apparatus adapted for providing a velocity flow profile of a gas flowing over an associated surface wherein the gas is associated with an initial flow direction. The apparatus includes a strut adapted to stand vertically from the associated surface, the strut including a constant thickness portion located between first and second ends, the constant thickness portion including a measuring surface being disposed parallel to the initial flow direction, a heater carried on the measuring surface for heating the gas as it passes the measuring surface, detecting means being operable to detect temperature differences from one side of the heater to the other side as the gas passes the measuring surface at successive predetermined heights above a reference line adapted to be aligned in parallel relationship to the associated surface and means for relating the temperature differences to gas velocity data at each of the successive heights whereby the gas velocity data at the successive heights provides the gas velocity profile.

According to another aspect of the invention, the detecting means includes a plurality of thermojunction pairs carried on the measuring surface, wherein one of each of the thermojunction pairs is located on a first side of the heater and the other one of the thermojunction pair is located on a second side of the heater, and wherein successive pairs of thermojunctions are located at the successive predetermined heights.

According to another aspect of the invention, the apparatus includes a first electrically conductive material carried on the measuring surface and extending between the first and second sides of the heater and being electrically insulated therefrom, and a second electrically conductive material carried on the measuring surface, the second electrically conductive material joining the first electrically conductive material on the first side of the heater to form the thermojunctions on the first side of the heater and joining the first electrically conductive material on the second side of the heater to form the thermojunctions on the second side of the heater.

According to another aspect of the invention, the first electrically conductive material is selected from the list consisting of chromel, alumel, platinum, platinum alloys, gold, and the like.

According to another aspect of the invention, the second electrically conductive material is selected from the list consisting of chromel, alumel, platinum, platinum alloys, gold, and the like.

According to another aspect of the invention, the heater comprises a material selected from the list consisting of alumel, platinum, and the like.

According to another aspect of the invention, the strut is formed of quartz, or any other low heat conductive material.

According to another aspect of the invention, the first and second ends of the strut are beveled.

According to another aspect of the invention, there is provided a method for providing a velocity flow profile of a gas flowing over an associated surface. The method includes the steps of providing a device having a measuring surface adapted to be aligned perpendicularly to the associated surface, the device being operable to determine gas velocity at successive predetermined heights above a reference line as the gas flows past the measuring surface; causing gas to flow past the measuring surface; obtaining gas velocity data at the successive predetermined heights; and, utilizing the gas velocity data to provide a velocity flow profile.

One advantage of the present invention is that a velocity flow profile can be attained very close to the reference surface.

Another advantage of the present invention is that the gas velocity data may be obtained simultaneously at various heights to provide a simultaneous velocity flow profile.

Another advantage of the present invention is that flow reversals can be detected and measured.

Another advantage of the present invention is that the turbulence levels at various heights can be obtained simultaneously close to the reference surface.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

The present invention is directed to a fluid-flow measuring device which utilizes a plurality of thermojunction pairs to provide a velocity flow profile. The device utilizes the dynamics of fluid motion relative to a constant thickness airfoil which stands vertically from a reference surface such that the span is normal to the surface, and the chord is parallel to the surface along the flow direction.

Figure 1:
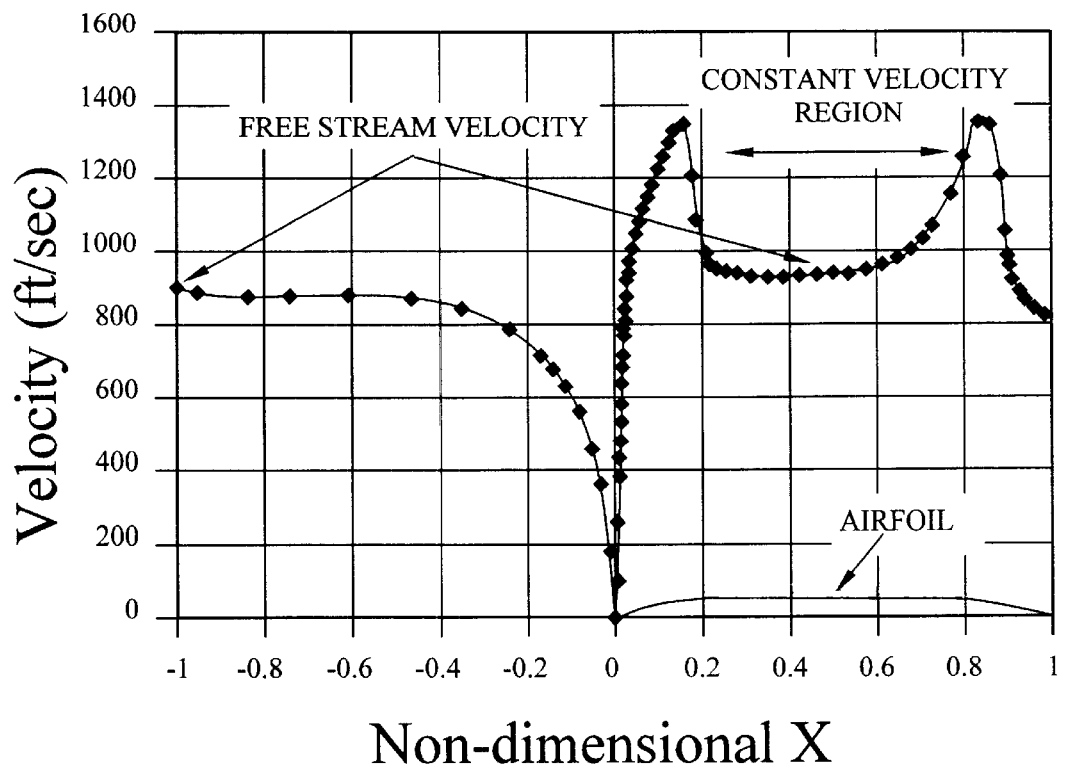
FIG. 1 is graphical representation of the computed gas flow behavior relative to a constant thickness airfoil.

Theoretically, the surface velocity of a fluid in the constant velocity region of a constant thickness airfoil matches the velocity of the fluid in a region ahead of the airfoil, shown graphically in FIG. 1. This principle is utilized in the device and methods of the present invention. Further, the velocity ahead of the airfoil varies depending on the vertical distance or height from the reference surface. The device of the present invention is able to detect the variation of these velocities inside the boundary layer. Further, the device and methods of the present invention provide information concerning flow direction as well as speed close to the boundary layer.

A preferred embodiment of the invention will be described with particular reference to the schematic representation shown in FIG. 2. The device 10 of the present invention includes a plurality of thermojunction pairs 1, 1'; 2, 2'; 3, 3'; . . . n, n', having one of each pair 1, 2, 3, . . . n, located on one side of a heater 24, and having the other of each pair 1', 2', 3', . . . n', located on the other side of the heater 24. The thermojunctions and heater 24 are carried on a side surface 30, also referred to as measuring surface 30, of a strut 34 that is adapted to stand vertically from a reference surface 40 (shown in phantom in this view) so that the measuring surface 30 is aligned generally parallel to the initial flow direction of the gas. In one preferred embodiment, the thermojunctions are formed at the junction of a first material 42 and a second material 46. The preferred materials include platinum, gold, chromel, alumel, platinum alloys, copper, constantan, and the like. The preferred embodiment utilizes a constant temperature heater, making platinum the presently preferred material for heater 24. In the most preferred embodiment, the heater 24 comprises a deposit of platinum, as does either the first material 42 or second material 46, and the other material comprises gold, so that the device can be made in a 2-step deposition process.

However, in the application of the present invention, the first and second materials 42, 46 may comprise any materials that may be utilized as a thermojunction as chosen with sound engineering judgment. In the preferred embodiment, the strut 34 is formed of quartz, or any low heat transfer material chosen with sound engineering judgment.

Figure 2:
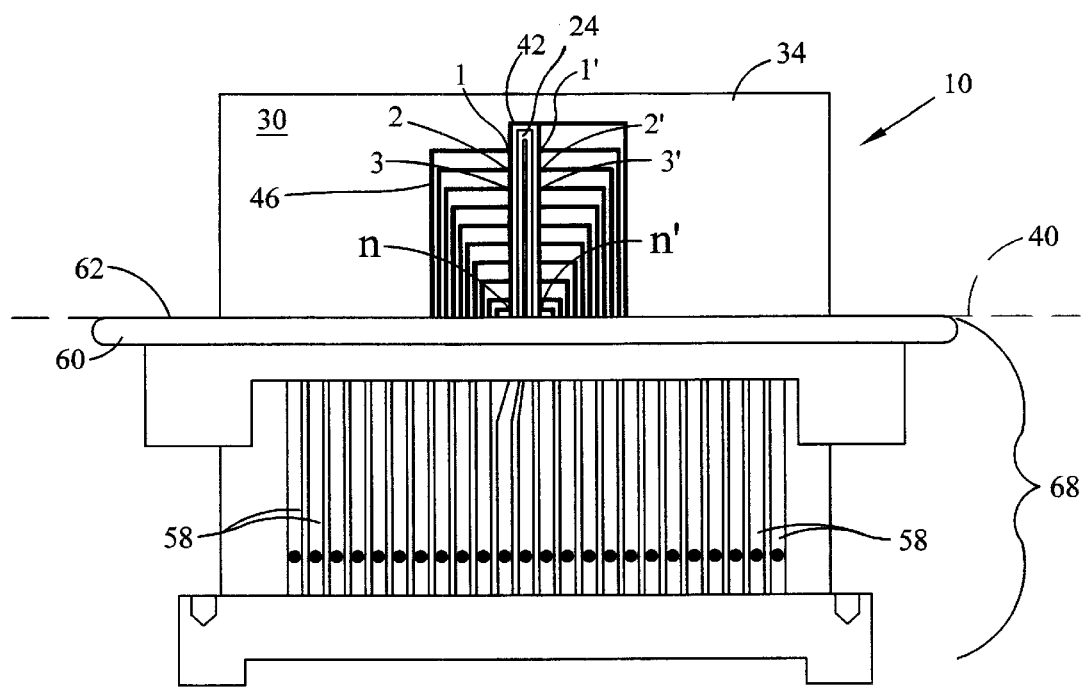
FIG. 2 is schematic representation of a preferred embodiment of the present invention.
Figure 3:
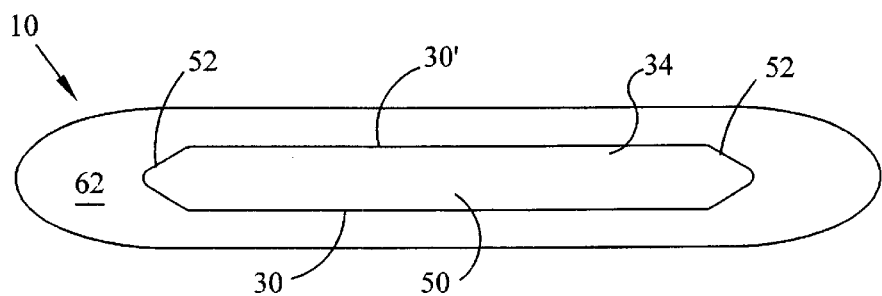
FIG. 3 is a top plan view of a velocity flow profile device according to the present invention.

With reference to FIGS. 2 and 3, the strut 34 functions as a constant thickness airfoil and includes a constant thickness portion 50 situated between two ends 52. In the preferred embodiment, both ends 52 of the strut 34 are similarly beveled so that reliable data can be obtained with the device 10 regardless of the flow direction of the gas, as will be explained in further detail below. The ability of the device 10 to provide gas velocity data regardless of flow direction is a significant advantage over flow devices known in the prior art.

The constant thickness portion 50 includes measuring surface 30, and therefore, the thermojunctions are spaced from the beveled ends 52. As disclosed above, the behavior of the gas passing a constant thickness airfoil will mimic the gas behavior ahead of the airfoil. Therefore, velocity data obtained by device 10, although actually gathered as the gas passes the strut 34, will be reliably indicative of the gas behavior ahead of the strut 34. Because the thermojunctions are spaced from the ends 52, and supported on the body of the strut 34, the device 10 is sturdier than total pressure boundary layer rakes and hot film or hot wire devices known in the art. Further, it is within the scope of the present invention to provide a second series of paired thermojunctions on strut 34 which are carried on a second measuring surface 30'.

In the preferred embodiment, the strut 34 is carried in a mounting member 60 having a first surface 62, normal to the measuring surface 30, and adapted to be co-planar with reference surface 40 when the device is utilized. As illustrated in FIG. 2, when device 10 is mounted so that first surface 62 is co-planar with the reference surface 40, a lower portion 68 of the device 10 is not acted upon by the gas. The strut 34 is electrically and thermally isolated from the first surface 62 and the mounting member 60.

Figure 4:
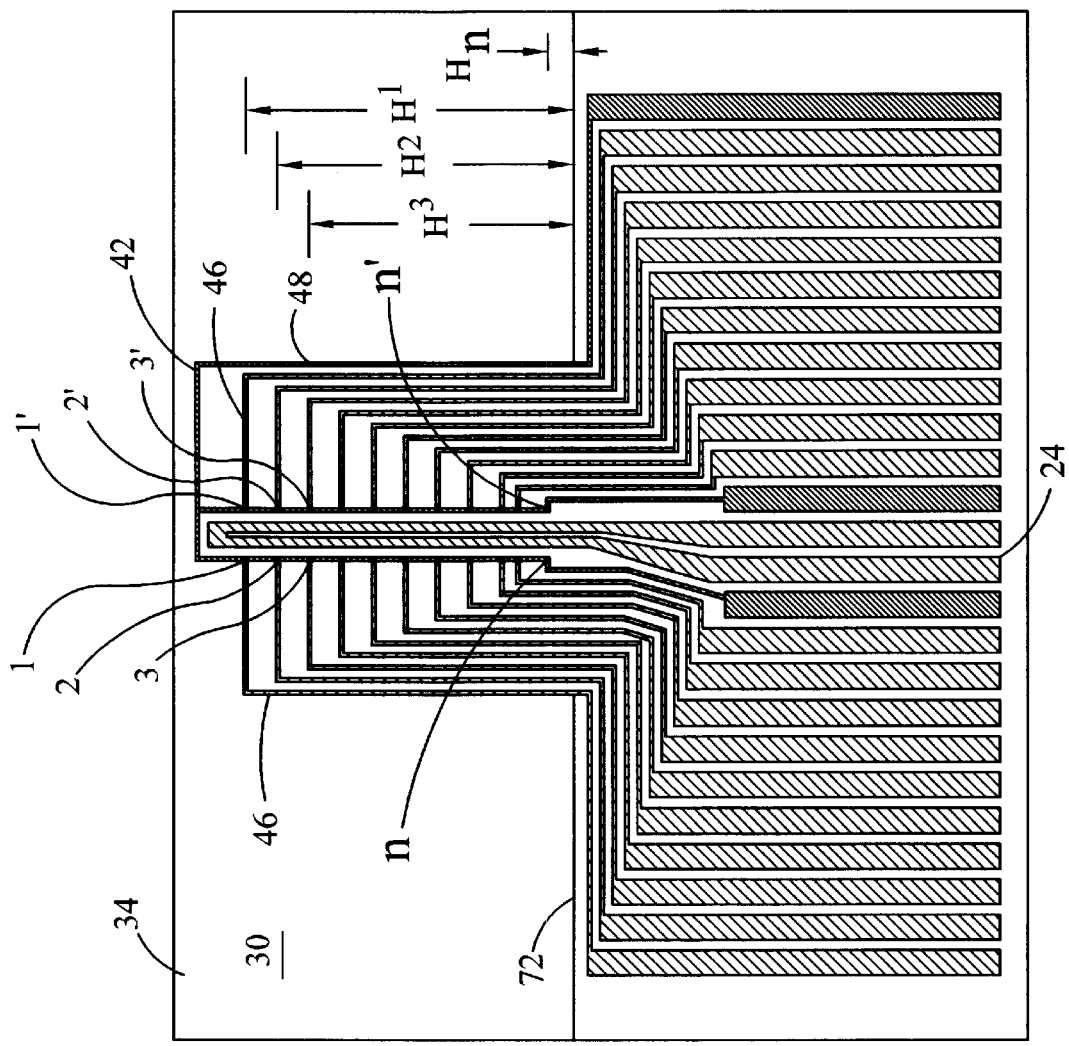
FIG. 4 is a side view of a strut having a series of thermojunction pairs deposited thereon.

The location of the thermojunctions will be discussed in more detail with specific reference to FIG. 4 which shows one embodiment of the strut 34 having deposits of first material 42, second material 46, as well as heater 24 carried on measuring surface 30. Each thermojunction in a given pair is positioned at a predetermined height H from a reference line 72 which is adapted to be aligned with, or is generally parallel to, reference surface 40. The pair of first thermojunctions 1, 1' are positioned at height H1 relative to reference line 72. The pair of second thermojunctions 2, 2' are positioned at height H2, the pair of third thermojunctions 3, 3' are positioned at height H3, and so on with the pair of nth thermojunctions n, n' positioned at Hn. In the preferred embodiment, a deposit 48 of first material 42 is utilized as a temperature reference.

Gas velocity data obtained at H1 is dependent on the temperature variation between first thermojunctions 1, 1'. Likewise, gas velocity data obtained at H2 is dependent on the temperature variation between second thermojunctions 2,2', and so on. As is readily apparent, the gas velocity data obtained at each of the heights H1 . . . Hn may be utilized to provide a gas velocity profile. One important advantage of the present invention is the ability to obtain simultaneous measurements of the gas velocity and turbulence levels at each of the heights H1 . . . Hn, rather than point by point measurements taken in hot wire or hot film devices where time becomes a contributing factor in the measurements.

In the operation of the device 10, thermojunction pairs, for example 1, 1' act as a thermocouple to measure a temperature difference from one side of the heater 24 to the other. With no gas flow past the strut 34, there is no temperature difference and therefore no electromotive force is generated. When the gas flow is not zero, the thermojunction upstream of the heater 24 will be cooler and the thermojunction downstream of the heater 24 will be hotter. As a result, a voltage will be generated which is proportional to the gas flow. If the flow reverses, the output voltage will also reverse. As a result, the device 10 can also detect flow reversal. The ability of the device 10 to detect and measure flow reversal provides a significant advantage over total pressure rakes. In a total pressure rake the gas must flow into a tube and therefore only gas flowing in an initial flow direction is measured. In the present invention, gas flow across the measuring surface 30 is detected, regardless of the flow direction, because a difference in temperature will be obtained between the pair of thermojunctions. In other words, if the gas flows in a first direction, one of the thermojunctions in the pair will be "upstream" and the other will be "downstream", if the flow direction reverses, the labeling of "upstream" and "downstream" will switch, but a difference in temperature can still be detected, and the voltage will be opposite in sign as compared to the initial voltage.

Any temperature differences between thermojunction pairs (in terms of electromotive forces) are fed via connections 58 to a multi-channel data recorder (not shown) as is commonly employed in the art. Any data recorder capable of providing the velocity data from the voltage outputs may be utilized with the device of the invention.

The number of thermojunction pairs may be as many as needed and is only limited by how many traces can be patterned on the measuring surface 30. The overall size of the device 10 is only limited by the ability to produce fine line photolithography.

As is readily apparent, the thermojunction pairs are not connected in series to provide an increased signal amplitude, as is employed in other thermocouple-type gas flow measuring apparatuses, but the voltage generated at each thermojunction pair is separately analyzed in order to provide the desired velocity flow profile.

Figure 5:
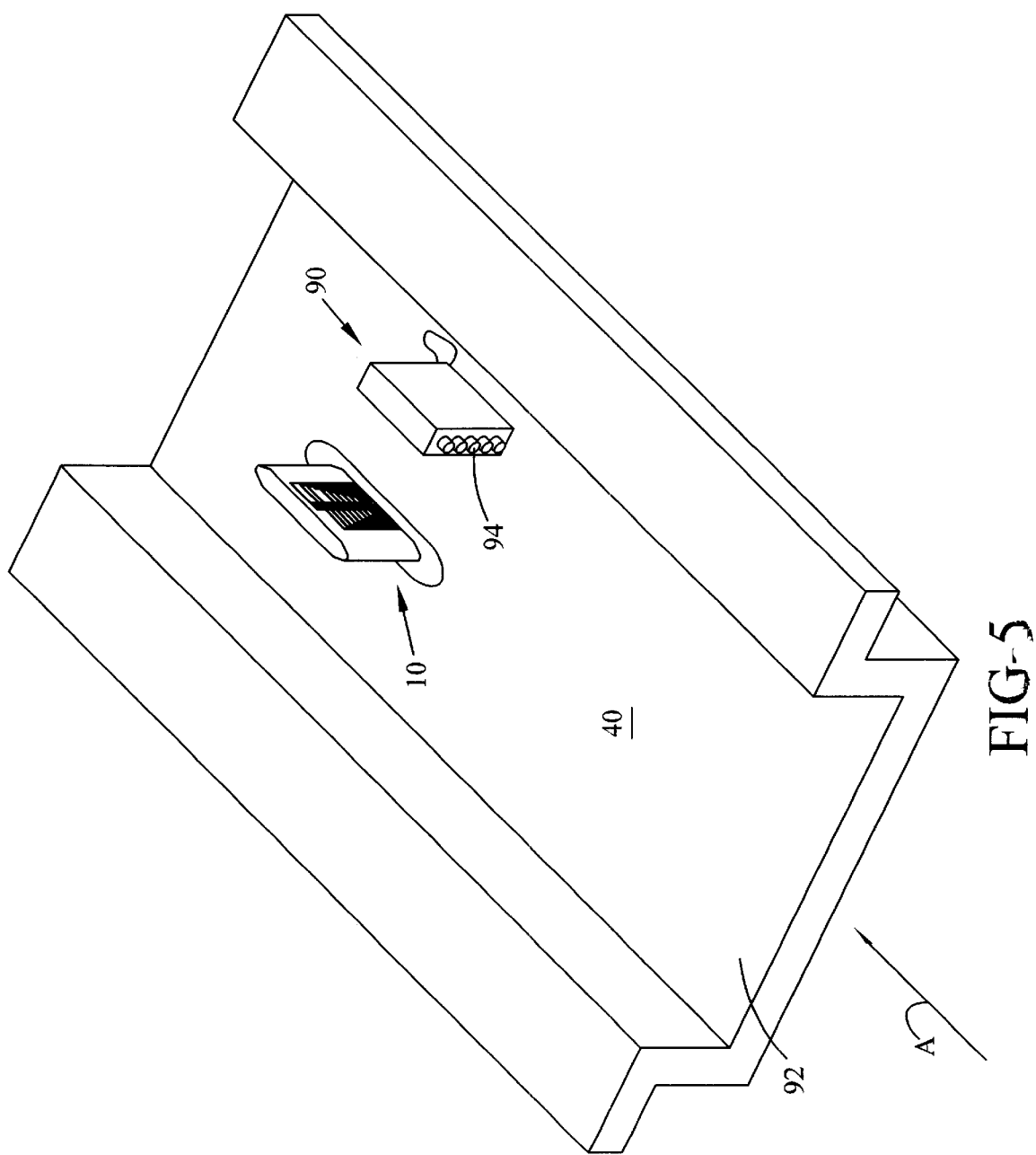
FIG. 5 is a perspective view of a gas flow channel with a prior art total pressure rake and a device according to the invention mounted therein for calibration purposes; and, FIG. 6 is a graphical representation of gas velocity data obtained by a total pressure rake and the voltage output obtained by the present invention as shown in FIG. 5.
Figure 6:
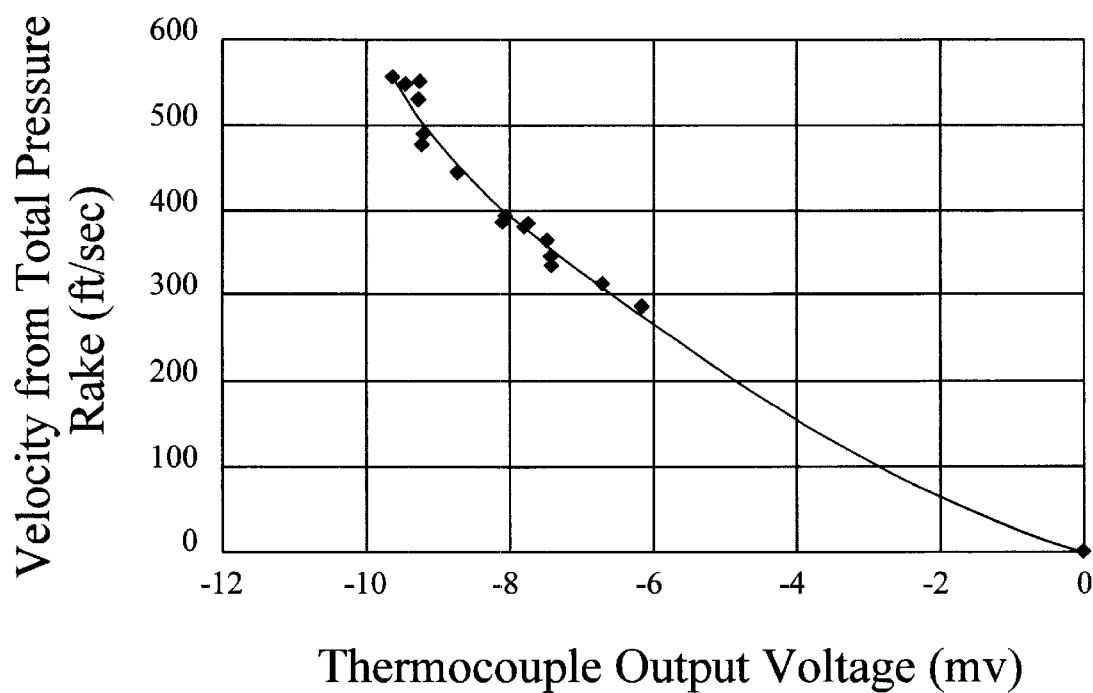

FIG. 5 is directed to a side-by-side arrangement of a device 10 according to the invention and a standard total pressure rake 90 in a typical flow channel 92 (top cover not shown) for purposes of providing calibration means for device 10. The total pressure rake 90 includes tubes 94 which are located at predetermined distances above the reference surface 40. The device 10 includes thermojunction pairs according to the present invention, wherein at least some of the pairs are located at corresponding heights H above the reference surface 40. An initial flow direction is indicated by arrow A. Thus, a calibration curve such as the one shown in FIG. 6 may be generated. The curve may be extrapolated to measurements obtained by the device disclosed herein taken closer to the reference surface than is possible with the standard total pressure rake 90.

The following table provides preferred arrangements of the thermojunction pairs in terms of the height H (inches) from a reference line 72 which generally aligns with a reference surface 40. Each example provides eleven heights at which data is obtained. Such an arrangement enables the use of standardized peripheral equipment, and should not be construed as limiting the present invention.

TABLE 1

THERMOCOUPLE BOUNDARY LAYER RAKE

| Height (inches) | Example 1 | Example 2 | Example 3 |
|---|---|---|---|
| H1 | 0.9 | 0.9 | 0.3 |
| H2 | 0.8 | 0.7 | 0.2 |
| H3 | 0.7 | 0.5 | 0.15 |
| H4 | 0.6 | 0.4 | 0.1 |
| H5 | 0.5 | 0.3 | 0.065 |
| H6 | 0.4 | 0.2 | 0.03 |
| H7 | 0.3 | 0.15 | 0.02 |
| H8 | 0.2 | 0.1 | 0.015 |
| H9 | 0.15 | 0.065 | 0.01 |
| H10 | 0.1 | 0.03 | 0.005 |
| H11 | 0.03 | 0.01 | 0.0025 |

It is believed that advancements in photolithography will allow thermojunction pairs to be located extremely close to the reference surface, which will continue to enhance the ability to provide a velocity flow profile near the boundary layer in accordance with the present invention. In the examples shown above, measurements of gas flow can be taken as close as 0.0025 inches from the reference surface. The examples given are for illustrative purposes only and should not be construed as limiting the present invention. In devices and methods known in the prior art, heat transfer problems arise when trying to obtain flow data close to the reference surface. The device described herein does not provide such heat transfer problems because the heater is thermally isolated from the reference surface and the temperature of the heater is lower than the hot wire.

A device 10 according to the present invention may alternately be utilized as a separation gauge to obtain separated flow data due to the ability to measure gas flow reversals. Further, the device 10 according to the present invention is able to provide turbulence data utilizing the mean fluctuation of velocity of the gas.

A method of providing a boundary layer velocity flow profile utilizes the following steps. A device 10 according to the present invention is provided having a measuring surface 30 adapted to be aligned perpendicularly to a reference surface 40. The device 10 utilizes pairs of thermojunctions to determine gas velocity at successive predetermined heights H above a reference line 72 as the gas flows past the measuring surface 30. The velocity of the gas at the predetermined heights is utilized to provide a velocity flow profile.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. An apparatus for providing a velocity flow profile of a gas flowing over an associated surface wherein the gas is associated with an initial flow direction, the apparatus comprising:

a strut, the strut including a constant thickness portion located between first and second ends, the constant thickness portion including a first measuring surface;

a first heater carried on the first measuring surface for heating the gas as it passes the first measuring surface;

first detecting means for detecting temperature differences from one side of the first heater to the other side as the gas passes the first measuring surface at successive predetermined heights above a reference line; and, means for relating the temperature differences to gas velocity data at each of the successive heights whereby the gas velocity data at the successive heights provides the gas velocity profile.

2. The apparatus of claim 1 wherein:

the first detecting means includes a plurality of thermojunction pairs carried on the first measuring surface, wherein one of each of the thermojunction pairs is located on a first side of the first heater and the other one of the thermojunction pair is located on a second side of the first heater, and wherein successive pairs of thermojunctions are located at the successive predetermined heights.

3. The apparatus of claim 2 including:

a first electrically conductive material carried on the first measuring surface and extending between the first and second sides of the first heater and being electrically insulated therefrom; and, a second electrically conductive material carried on the first measuring surface, the second electrically conductive material joining the first electrically conductive material on the first side of the first heater to form the thermojunctions on the first side of the first heater and joining the first electrically conductive material on the second side of the first heater to form the thermojunctions on the second side of the first heater.

4. The apparatus of claim 3 wherein the first electrically conductive material is selected from the list consisting of:

chromel, alumel, platinum, platinum alloys, and gold.

5. The apparatus of claim 3 wherein the second electrically conductive material is selected from the list consisting of:

chromel, alumel, platinum, platinum alloys, and gold.

6. The apparatus of claim 1 wherein the heater comprises a material selected from the list consisting of:

alumel, and platinum.

7. The apparatus of claim 1 wherein the strut is formed of quartz.

8. The apparatus of claim 1 wherein the first and second ends of the strut are beveled.

9. The apparatus of claim 1 wherein one of the heights is less than 0.02 inches above the reference line.

10. The apparatus of claim 1 wherein one of the heights is less than 0.01 inches above the reference line.

11. The apparatus of claim 1 further comprising:

a second measuring surface located on the opposite side of the constant thickness portion;

a second heater carried on the second measuring surface for heating the gas as it passes the second measuring surface; and, second detecting means for detecting temperature differences from one side of the heater to the other side as the gas passes the second measuring surface at successive predetermined heights above a reference line.

12. A method for providing a velocity flow profile of a gas flowing over an associated surface comprising the steps of:

providing a device having a measuring surface adapted to be aligned perpendicularly to the associated surface, the device being operable to determine gas velocity at successive predetermined heights above a reference line as the gas flows past the measuring surface;

causing gas to flow past the measuring surface;

obtaining gas velocity data at the successive predetermined heights; and, utilizing the gas velocity data to provide a velocity flow profile.

13. The method of claim 12 wherein the step of providing a device includes the steps of:

providing a strut adapted to stand vertically from the associated surface, the strut including a constant thickness portion located between first and second ends, the constant thickness portion including the measuring surface;

providing a heater carried on the measuring surface for heating the gas as it passes the measuring surface;

providing detecting means being operable to detect temperature differences from one side of the heater to the other side as the gas passes the measuring surface at successive predetermined heights above a reference line adapted to be aligned in parallel relationship to the associated surface; and, providing means for relating the temperature differences to gas velocity data at each of the successive heights.

14. The method of claim 13 wherein the step of providing detecting means includes the step of:

providing a plurality of thermojunction pairs carried on the measuring surface, wherein one of each of the thermojunction pairs is located on a first side of the heater and the other one of the thermojunction pair is located on a second side of the heater, and wherein successive pairs of thermojunctions are located at the successive predetermined heights.

15. The method of claim 14 wherein the step of providing a plurality of thermojunction pairs includes the steps of:

providing a first electrically conductive material carried on the measuring surface and extending between the first and second sides of the heater and being electrically insulated therefrom; and, providing a second electrically conductive material carried on the measuring surface, the second electrically conductive material joining the first electrically conductive material on the first side of the heater to form the thermojunctions on the first side of the heater and joining the first electrically conductive material on the second side of the heater to form the thermojunctions on the second side of the heater.

16. The method of claim 12 further comprising the step of:

utilizing the gas velocity data to provide simultaneous measurements of turbulence levels inside a boundary layer at the successive heights.

* * * * *